United States Patent
Agea

(10) Patent No.: US 10,457,577 B2
(45) Date of Patent: Oct. 29, 2019

(54) WASTE SEPARATION DEVICE WITH SEPARATION MAGNETIC FILTER

(71) Applicant: Airbus Operations S.A.S., Toulouse (FR)

(72) Inventor: Laurent Agea, Grazac (FR)

(73) Assignee: Airbus Operations S.A.S. (FR)

( * ) Notice: Subject to any disclaimer, the term of this patent is extended or adjusted under 35 U.S.C. 154(b) by 193 days.

(21) Appl. No.: 15/645,083

(22) Filed: Jul. 10, 2017

(65) Prior Publication Data
US 2018/0016165 A1 Jan. 18, 2018

(30) Foreign Application Priority Data
Jul. 18, 2016 (FR) .................... 16 56834

(51) Int. Cl.
| | | |
|---|---|---|
| *C02F 1/48* | (2006.01) | |
| *B01D 21/00* | (2006.01) | |
| *B03C 1/033* | (2006.01) | |
| *B03C 1/28* | (2006.01) | |
| *B03C 1/30* | (2006.01) | |

(52) U.S. Cl.
CPC .......... *C02F 1/488* (2013.01); *B01D 21/0009* (2013.01); *B03C 1/033* (2013.01); *B03C 1/28* (2013.01); *B03C 1/284* (2013.01); *B03C 1/288* (2013.01); *B03C 1/30* (2013.01)

(58) Field of Classification Search
None
See application file for complete search history.

(56) References Cited

U.S. PATENT DOCUMENTS

| | | | |
|---|---|---|---|
| 5,043,063 A | 8/1991 | Latimer | |
| 5,188,239 A | 2/1993 | Stowe | |
| 6,210,457 B1 * | 4/2001 | Siemers | ................. B01D 45/16 |
| | | | 55/429 |
| 6,758,874 B1 * | 7/2004 | Hunter, Jr. | ................ A47L 9/20 |
| | | | 15/352 |

(Continued)

FOREIGN PATENT DOCUMENTS

| | | |
|---|---|---|
| DE | 10018388 C1 | 1/2002 |
| EP | 2 524 730 A2 | 11/2012 |
| FR | 2 887 471 A1 | 12/2006 |

OTHER PUBLICATIONS

FR 16 56834 Search Report dated Apr. 12, 2017 (p. 2 categorizing the cited references).

*Primary Examiner* — Krishnan S Menon
(74) *Attorney, Agent, or Firm* — Lerner, David, Littenberg, Krumholz & Mentlik, LLP

(57) ABSTRACT

A device for separating waste includes a tank having a closed internal chamber, the device being provided with an inlet opening and an outlet opening that can be connected to a suction system. The internal chamber of the tank is provided with a magnetic filter making it possible to attract and retain ferromagnetic waste likely to be entrained by the suction system into the tank, with a grating placed between the filter and the base of the tank, with a fluid discharge system at the level of its base. The device which is intended to be connected to a suction system makes it possible to retain and recover, sorted, the waste sucked in by said system and prevent the latter from polluting the pipelines thereof until they are blocked.

10 Claims, 3 Drawing Sheets

(56) References Cited

U.S. PATENT DOCUMENTS

| | | | |
|---|---|---|---|
| 8,132,674 B1* | 3/2012 | Allore | B03C 1/0332 209/223.1 |
| 9,901,931 B2* | 2/2018 | Yen | B03C 1/032 |
| 2004/0035760 A1 | 2/2004 | Alford et al. | |

* cited by examiner

WASTE SEPARATION DEVICE WITH SEPARATION MAGNETIC FILTER

FIELD OF THE INVENTION

The present invention relates to a device for separating particles, debris, fragments or other waste, said device being used in suction networks for collecting those of significant size likely to block the pipe lines of said networks.

BACKGROUND OF THE INVENTION

When assembling an aircraft, operations producing a large quantity of particles, debris, fragments or other waste have to be carried out, such as drilling and machining operations or operations of any other type, as well as pouring of various fluids such as cutting oil. These operations create pollution of the working environment that has to be cleaned in order to prevent it from becoming detrimental to subsequent operations.

The patent application DE10018388 filed by Airbus GmbH describes a system for cleaning the surface of components to improve the condition thereof in order to receive an adhesive thereon. The system comprises a suction system making it possible to discharge the particles. As seen above, the particles produced are of various types and sizes, such as fine dust, fibers, chippings, depending on the operations carried out. The size and the number of the particles sucked into the system can clog or even plug the pipe lines thereof.

BRIEF SUMMARY OF THE INVENTION

An aspect of the present invention may mitigate this drawback and propose a simple device for separating waste produced by various surface treatment operations or other operations and discharged using a suction system.

An aspect of the present invention proposes a device for separating waste comprising a tank having a closed internal chamber, the device being provided with an inlet opening and an outlet opening that can be connected to a suction system, wherein the internal chamber of the tank is provided:

with a magnetic filter making it possible to attract ferromagnetic waste likely to be entrained by the suction system into the tank;
with a grating placed between the filter and the base of the tank;
with a fluid discharge system at the level of its base.

In this way, the device which is intended to be connected to a suction system makes it possible to retain and recover, sorted, the waste sucked in by said system and to prevent the latter from polluting the pipe lines thereof until they are blocked.

The invention has at least one of the following optional features, taken in isolation or in combination.

The filter takes the form of at least one bar passing at least partially through the internal chamber of the tank.

Several mutually parallel bars passing through one and the same plane P3 pass at least partially through the internal chamber of the tank.

The filter takes the form of a comb of bars made of a single piece.

The comb comprises a comb of magnetic cores and a comb of sheaths, each core of the comb being inserted respectively into each sheath of the comb.

The grating is arranged below the plane P3 formed by the bars.

The tank comprises a grating placed between the filter and the base of the tank.

The tank is provided at its base with a fluid discharge system.

The base is inclined such that a fluid resting on the base can flow toward said discharge system.

The base is provided with a discharge orifice, the orifice being associated with a cock fixed to the outer face of the tank.

The tank comprises a container and a cover.

The cover has two openings, an inlet opening and an outlet opening to which, respectively, two pipes of a pipeline network of the suction system are intended to be connected.

BRIEF DESCRIPTION OF THE DRAWINGS

Other aims, advantages and features of the invention will become apparent on reading the following description of the device according to the invention, given as a nonlimiting example with reference to the drawings attached herewith, in which.

DETAILED DESCRIPTION

Figure 1:
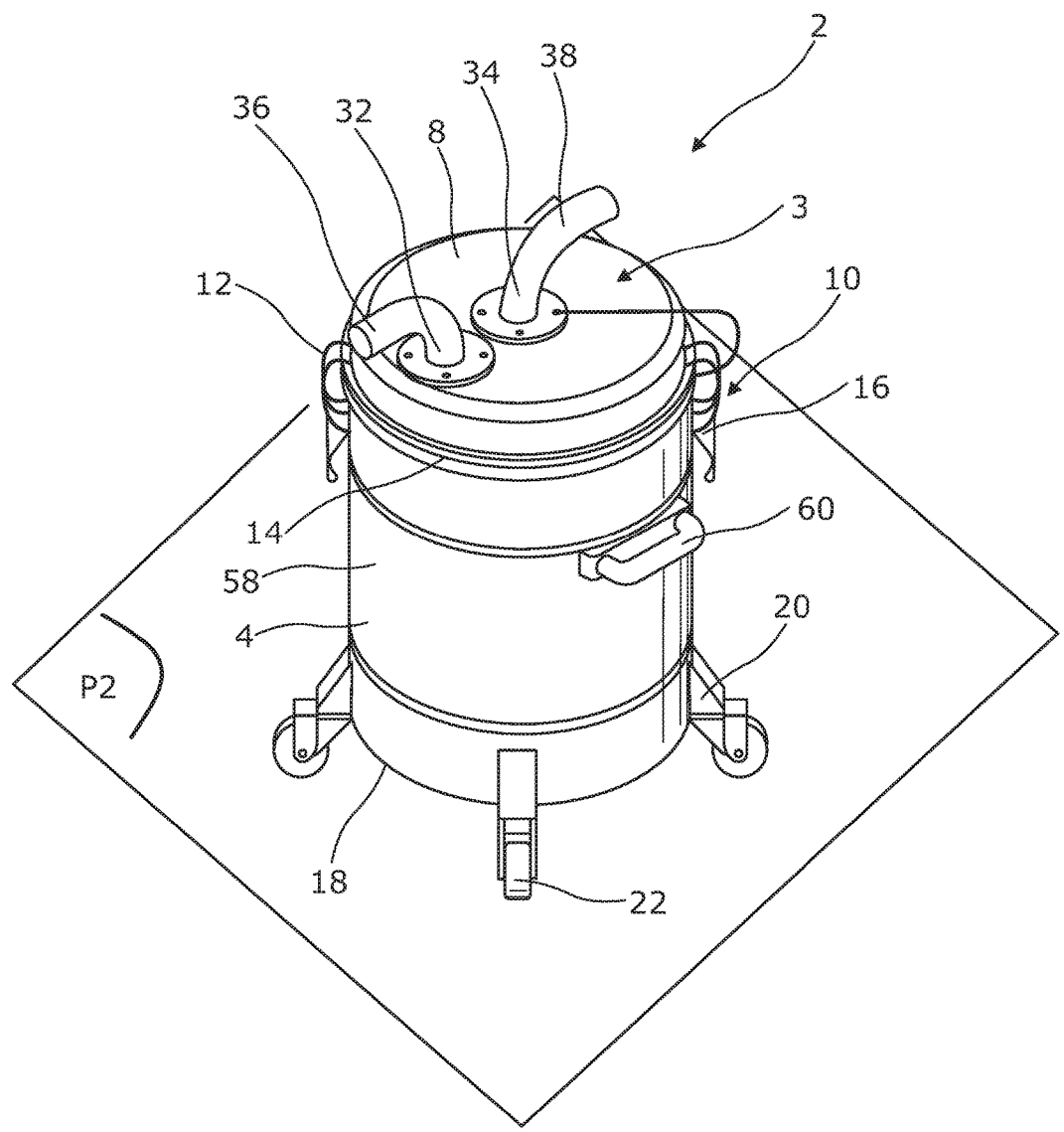
FIG. 1 represents a perspective view of an embodiment of the separation device according to an embodiment of the present invention.

As represented in FIG. 1, the waste separation device 2 comprises a tank 3 that can take any kind of form making it possible to receive and contain particles, dust, fragments, chippings, parts or other elements as well as various types of fluids likely to be sucked in by a suction system of known type not represented. All of said elements and fluids will be referred to in the following description by the term waste 6. The tank 3 is closed to prevent the waste located inside the latter from escaping under the effect of an air current for example. A tank opening system is provided to access the interior thereof: the tank 3 for example comprises a container 4 and a cover 8. The container 4 and the cover 8 are provided with at least one lock 10 of known type to hold the cover in place on the container 4. The lock 10 illustrated in FIG. 1 comprises a hook 12 fixed to the container 4 and which can be engaged with a groove 14 provided at the level of the cover 8. The lock has a handle 16 for maneuvering the hook 12. In the embodiment illustrated, the container 4 has an overall cylindrical form of circular section. The cover 8 also has an overall cylindrical form of circular section with a diameter that is slightly greater than that of the container to allow the cover 8 to be fitted on the container 4 and to ensure a hermetic sealing of the container 4. The cover is provided with two locks 10, which are arranged so that they are diametrically opposite one another.

According to an embodiment not illustrated, the cover 8 could be integrated with the container 4 and the tank 3 to form only a single block. Whether the cover 8 is integrated or not with the container 4, the tank 3 has a hermetically-sealed internal chamber 17.

The description below will be based throughout on the embodiment in which the tank 3 comprises a container 4 and a cover 8, but the assembly of the elements described, apart from the lock, applies to the tank made of a single piece.

Figure 2:
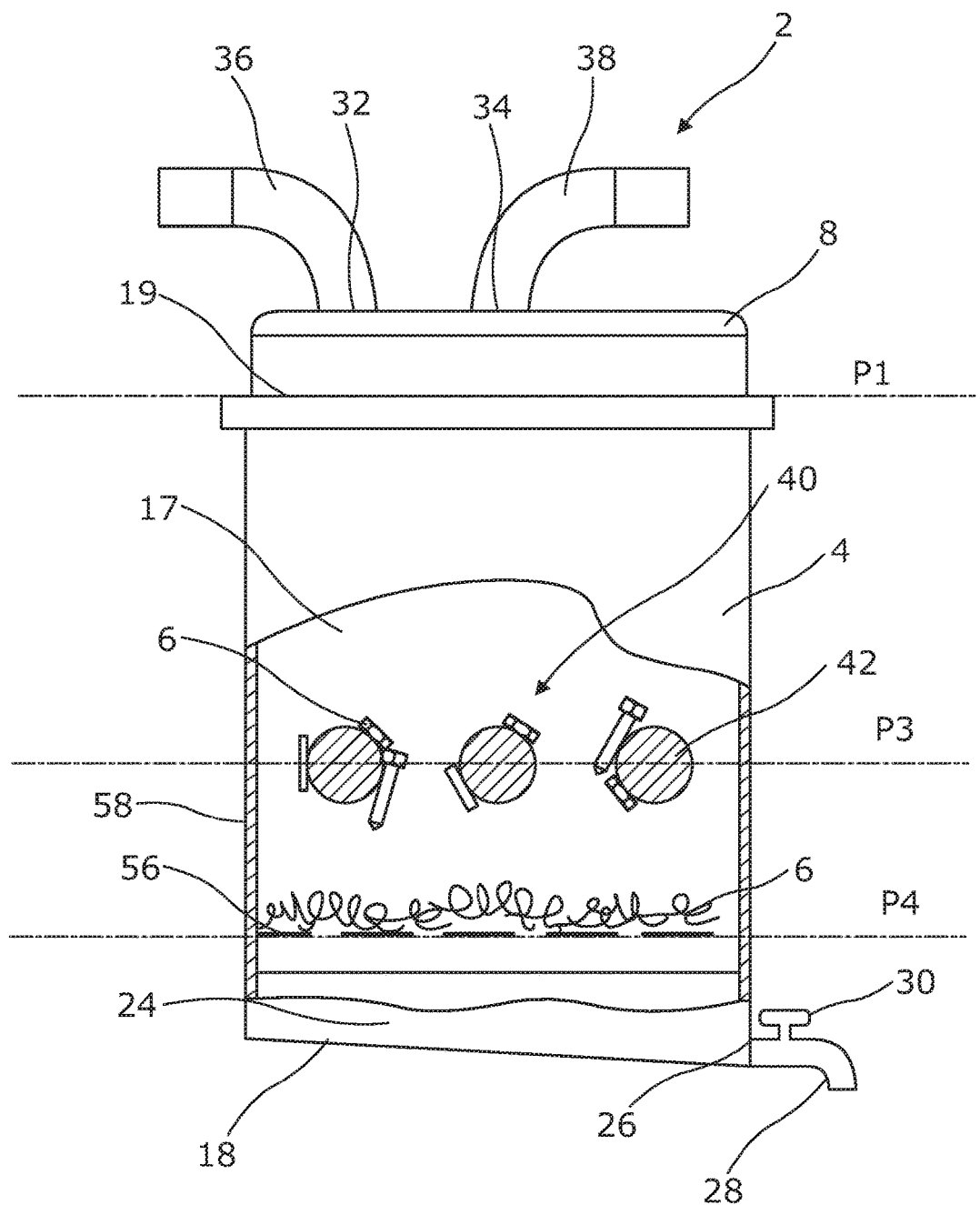
FIG. 2 represents a schematic plan view of the interior space of the separation device according to an embodiment of the present invention.

The base 18 forming the bottom of the tank 4 is provided with at least one foot 20. The base 18 is located at the end opposite the opening 19 of the container where the cover 8 is positioned. The perimeter of the opening 19 of the container 4 is located on a plane P1. The container 4 rests on the foot or feet 20. In the embodiment illustrated in FIG. 1, the container is provided with four feet 20 of which one is concealed by the container 4 in FIG. 1. Each foot 20 can be provided with one or more coasters 22 to facilitate the moving of the device 2. The feet 20 are such that they make it possible to bear the container 4 so that the base 18 is raised and does not rest on the surface on which the device 2 is arranged, such as the ground for example. In this way, it is possible to provide a base 18 which is parallel neither to the plane P1 of the opening 19, nor to the plane P2 formed by the surface on which the device 1 rests. The base 18 is inclined as can be seen in FIG. 2. The inclination allows a fluid 24 such as a cutting fluid for example, to flow toward a discharge system comprising an orifice 26 for discharging to the outside of the container 4. A cock 28 is fixed onto the outer face of the container at the level of the discharge orifice 26. Fastening to the container bottom is made possible by the base 18 of the container being kept raised. The cock can thus protrude downward relative to the lowest end of the container. The cock 28 makes it possible to block the orifice 26 and to control, using a control handle 30, the opening thereof to discharge the fluid or fluids 24 located at the bottom of the container.

The cover 8 has two openings, an inlet opening 32 and an outlet opening 34, to which, respectively, two pipes 36, 38 of a pipeline network of the suction system are tightly connected. One of the pipes 36 is more specifically associated with a cleaning system using the suction system; the other pipe 38 is associated with the system for sucking and discharging waste sucked in and not retained by the device 2.

Inside the container 4, a magnetic filter 40 is provided. The filter 40 takes any kind of form. The filter 40 is fixed or incorporated inside the container and it makes it possible to attract the ferromagnetic waste 6, for example of ferrous part type. According to possible embodiments of which one is illustrated, the filter 40 is removable.

Figure 3:
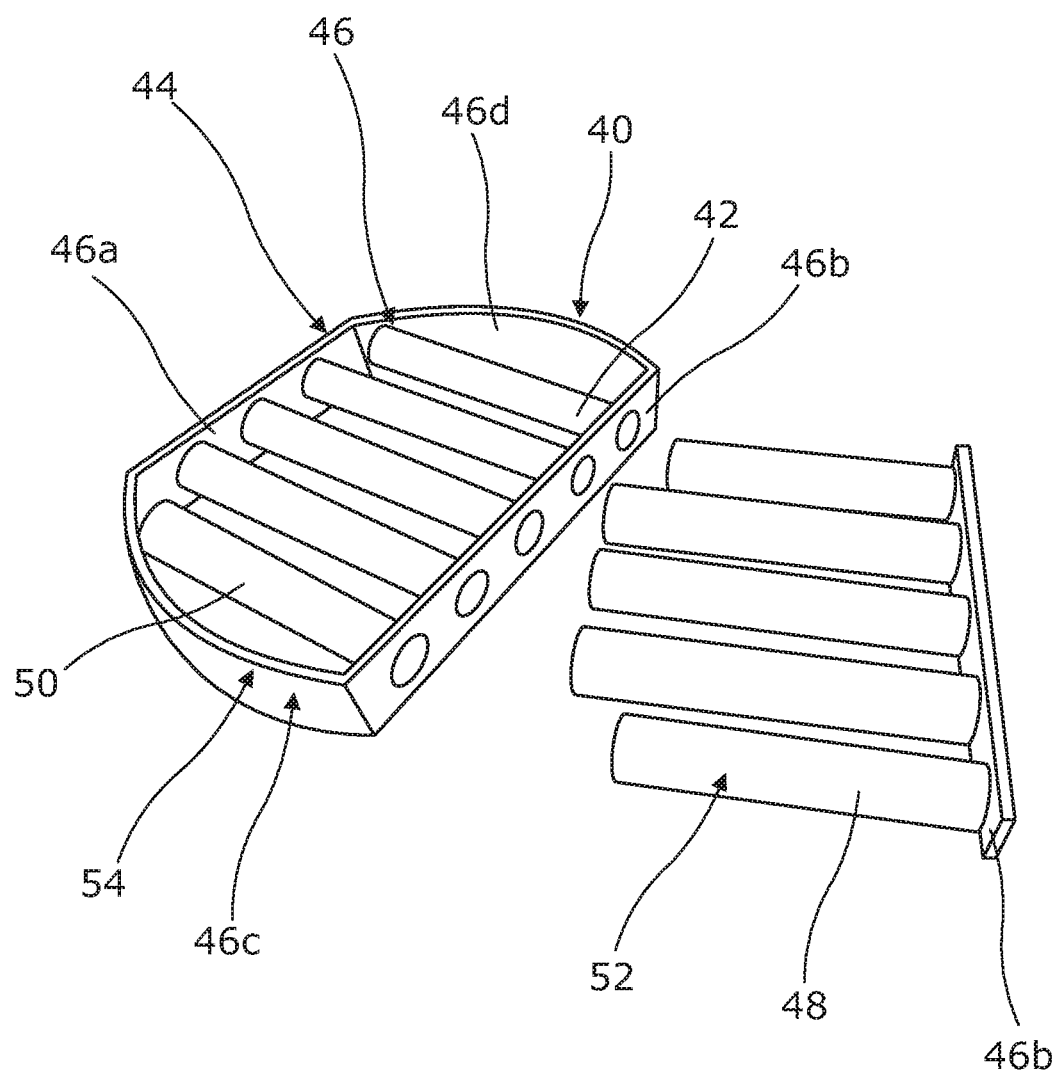
FIG. 3 represents a perspective view of a comb of magnetic bars intended to be incorporated inside the tank of the device according to an embodiment of the present invention.

The filter 40 for example takes the form of at least one bar 42 and, in the embodiment illustrated, of several mutually parallel bars 42 passing at least partially through the internal space of the container 4. All of the bars are located on one and the same plane P3 represented in FIG. 2. The bars are parallel to the plane P1 of the opening 19 and/or to the plane P2 formed by the surface on which the device 2 rests. The bars 42 can be linked to one another to form a comb 44 of bars made of a single piece or block. As FIG. 3 shows, the comb 44 comprises a frame 46 surrounding the bars 42. The frame 46 has an outer form at least partially corresponding to the inner form of the container 4 to allow it to be pressed against the latter. In the embodiment illustrated, the frame is formed by two straight and mutually parallel uprights 46a and 46b respectively adjoining each of the ends of the bars 42 together and two other uprights 46c and 46d having a curvature identical to that of the container 4 on the internal face of which the uprights 46c and 46d come to be pressed in order to be fixed thereto. The frame 46 comprises fixing means of known type to ensure that is it held inside the container in such a way that the uprights 46c and 46d of the frame are pressed against and are fixed to the internal wall of the container and so that the bars 42, located on the same plane P3, are parallel to the plane P1 of the opening 19 and/or to the plane P2 of the surface on which the device 2 rests. In this way, the bars 42 form a magnetic filter through which the waste falls, and for some of them, the weight and the material are such that they are retained by magnetism on the bars 42.

In the embodiment illustrated in FIG. 3, the bar 42 is formed in two parts: a magnetic core 48 and a non-magnetic sheath 50 inside which the core 48 can be inserted. As an illustration, the core is an alloy of neodymium, iron and boron and the sheath is made of stainless steel. The core 48 and the sheath 50 are of complementary forms. In the embodiment illustrated, the core 48 and the sheath 50 are of cylindrical form with circular section and dimensions such that the core 48 slides into the sheath 50. When the bars 42 are arranged in a frame 46, the frame 46 comprises two parts as represented in FIG. 3: a comb 52 of magnetic cores 48 and a comb 54 of non-magnetic sheaths 50. In the embodiment illustrated, the comb 52 of cores comprises only one upright 46b linking all of the cores only by one of their ends. The comb 54 of sheaths comprises four uprights 46a, 46b, 46c, 46d. The comb 52 of cores is fitted into the comb 54 of sheaths, each core 48 being inserted inside the respective sheath 50. When the two combs 52, 54 are fitted into one another, they form a moveable whole made of a single piece and forming a single comb 44 of magnetic bars. The advantage of this embodiment is that, by removing the comb 52 of cores from the comb 54 of sheaths, the waste made up of ferromagnetic materials which was retained by magnetism on the sheaths 50 separates from these non-magnetic sheaths in the absence of the magnetic cores 48 which attracted said waste.

The container 4 comprises a grating 56. The grating 56 is fixed to or incorporated inside the container so as to be located in a plane P4 parallel to the plane P1 of the opening 19 and/or to the plane P3 of that formed by the bars 42 and/or to the plane P2 of that of the surface on which the device 2 rests. The grating 56 is arranged below the plane P3 formed by the bars 42. In this way, the waste made up of non-ferromagnetic materials falls between the bars 42 to be retained, for some of said waste, by the grating 56 arranged below (the waste whose excessively large size does not allow it to pass though the grating or even, according to another example, the waste which is blocked in one way or another by the grating). Similarly, waste made of ferromagnetic materials can fall between the bars 42 without being retained by the latter and is retained by the grating 56.

As FIG. 1 shows, the container 4 comprises a part 58 allowing access to the interior of the container by tilting, sliding or other such means, by opening a hatch or door or similar or by removing said part of the container 4 or even by any other mechanism allowing access to the interior of the chamber 17. In the embodiment illustrated in FIG. 1, the part 58 tilts by pulling on a handle 60 to allow the removal of the waste retained on the one hand by the magnetic filter 40 and on the other hand by the grating 56. In this way, it is possible to recover parts which would have been lost during some operations and which may have a significant cost.

The waste separation device 2 operates as follows:

During cleaning operations, solid or fluid waste 6 is sucked into and conveyed in pipelines of a suction system. The waste 6 is guided by the pipe 36 to the inlet opening 32 of the container 4, through which a part of the waste 6 is sucked through the outlet opening 34 into the pipe 38 of the suction system and the other part of the waste falls by gravity into the container 4.

Most of the ferromagnetic material waste 6 which falls into the container 4 is retained by the magnetic filter 40 and adheres by magnetism to the bars 42.

The other waste which is introduced into the container 4 and which is not retained by the filter 40 can, for another part, be trapped by the grating 56.

The rest of the waste which has been able to pass through the filter 40 and the grating 56, and in particular all the fluids, are deposited on the bottom 18 of the container.

At the end of the cleaning or at any other moment when the suction is interrupted, the various fluids are recovered by opening the cock 28 to allow them to flow through the orifice 26 into a tray placed under the cock or any other recovery device.

Access to the internal chamber 17 of the container 4 can be obtained by unlocking the cover 8 or, more easily, through the part 58. In the embodiment illustrated, the part 58 tilts by pulling on the handle 60. In the case of a non-removable filter 40, access to the interior of the chamber makes it possible to remove the ferromagnetic waste by hand from the filter 40. In the case of a removable magnetic filter 40, the filter 40, and in this case the bars 42, even the comb 44, can be removed from the internal chamber 17 of the container 4.

The cores 48, isolated or linked in a comb, are removed from the sheaths 50 that are isolated or linked in a comb. The waste 6 is then detached from the sheaths and is recovered. It is also possible to remove the waste 6 without removing the filter from the container even though it is removable.

The grating 56 can also be removed to recover the waste 6 that is retained by the latter. It is also possible to recover the waste without removing the grating 56.

Finally, all the solid waste 6 that has not been able to be discharged through the cock 28 is recovered by hand from the bottom 18 of the container.

In this way, the device 2 makes it possible to separate the waste according to its type, material or size and to be able to recover the said waste, sorted, by the device 2. The device avoids the blocking of the pipelines by retaining the most bulky waste products. Moreover, it is possible to retrieve individual parts easily such as shims nuts, pins or similar retained by the filter 40 or the grating 56. These parts can thus be reused and the cost that would be represented by their loss is reduced.

The present invention is not limited to the aeronautical field. The separation device according to the present invention could be used in many other technical fields in which it would be of interest to have a separation device to avoid blocking a suction system and to facilitate the recovery of the waste circulating in the pipelines of the system.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for separating waste, the device comprising:
a tank having a closed internal chamber having an opening with a perimeter located in a first horizontal plane,
wherein the device is provided with an inlet opening and an outlet opening that can be connected to a suction system,
wherein the internal chamber of the tank is provided
    with a magnetic filter making it possible to attract and retain ferromagnetic waste likely to be entrained by the suction system into the tank;
    with a grating placed between the filter and the base of the tank; and
    with a fluid discharge system at the level of a base of the internal chamber, and
wherein the inlet opening and the outlet opening are located on a same side of the first horizontal plane and the magnetic filter is arranged on other side of the first horizontal plane.

2. The waste separation device as claimed in claim 1, wherein the magnetic filter comprises at least one bar passing at least partially through the internal chamber of the tank.

3. The waste separation device as claimed in claim 2, wherein the magnetic filter comprises several mutually parallel bars passing through one and the same second horizontal plane and passing at least partially through the internal chamber of the tank, wherein the second horizontal plane is parallel to the first horizontal plane.

4. The waste separation device as claimed in claim 3, wherein the magnetic filter comprises a comb of bars made of a single piece.

5. The waste separation device as claimed in claim 4, wherein the comb comprises a comb of magnetic cores and a comb of sheaths, each core of the comb being inserted respectively into each sheath of the comb.

6. The waste separation device as claimed in claim 3, wherein the grating is arranged below the second horizontal plane formed by the bars.

7. The waste separation device as claimed in claim 1, wherein the base is entirely inclined along a third plane such that a fluid resting on the base can flow toward said discharge system, wherein the third plane is not parallel to the first horizontal plane.

8. The waste separation device as claimed in claim 1, wherein the base is provided with a discharge orifice, the orifice being associated with a cock fixed to the outer face of the tank.

9. The waste separation device as claimed in claim 1, wherein the tank comprises a container and a cover.

10. The waste separation device as claimed in claim 9, wherein the cover has the inlet opening and the outlet opening to which, respectively, two pipes of a pipeline network of the suction system are configured to be connected.

* * * * *